Sept. 23, 1924.

A. WORCESTER

CLUTCH

Filed Aug. 25, 1922

1,509,626

INVENTOR
Albert Worcester.
by Hazard & Miller
ATT'YS.

Patented Sept. 23, 1924.

1,509,626

UNITED STATES PATENT OFFICE.

ALBERT WORCESTER, OF LOS ANGELES, CALIFORNIA.

CLUTCH.

Application filed August 25, 1922. Serial No. 584,262.

*To all whom it may concern:*

Be it known that I, ALBERT WORCESTER, a subject of the King of Great Britain, residing at Los Angeles, in the county of Los Angeles and State of California, have invented new and useful Improvements in Clutches, of which the following is a specification.

This invention relates to machine elements and more particularly to clutches.

It is an object of the present invention to provide an extremely simple, practicable, effective and durable form of clutch mechanism enabling the instantaneous coupling of one rotative element with another.

An object is to provide a clutch in which there are but few and extremely simple parts which can be readily renewed and interchanged.

An important object is to provide a clutch consisting of but one clutch setting element.

Other objects and advantages will be made manifest in the following specification of an embodiment of the invention illustrated in the accompanying drawings, wherein.

Figure 3:
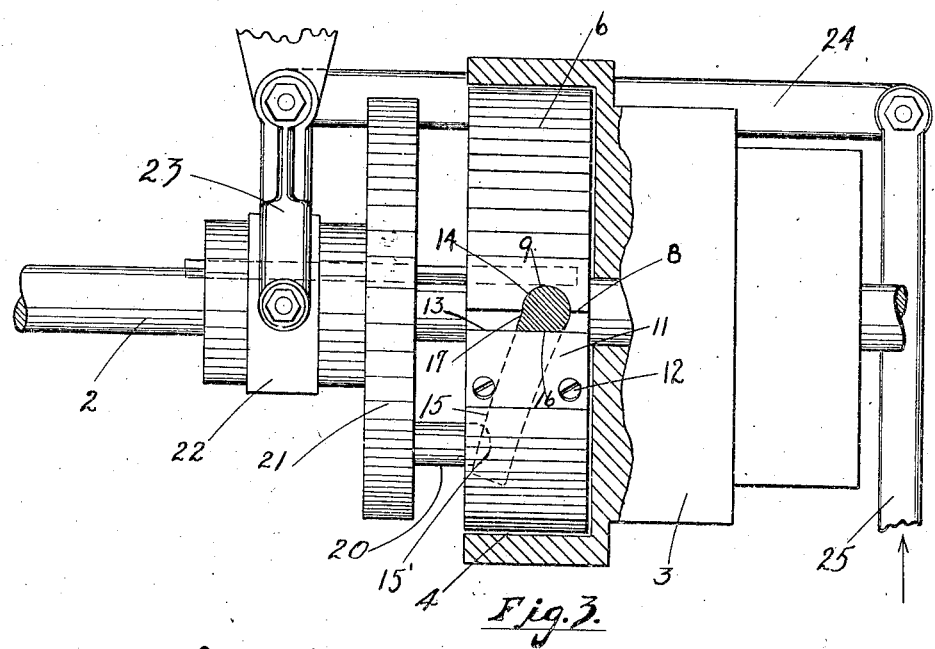
Figure 3 is a partial section and side elevation longitudinally of a mechanism incorporating the improved clutch.
Figures 1, 2:
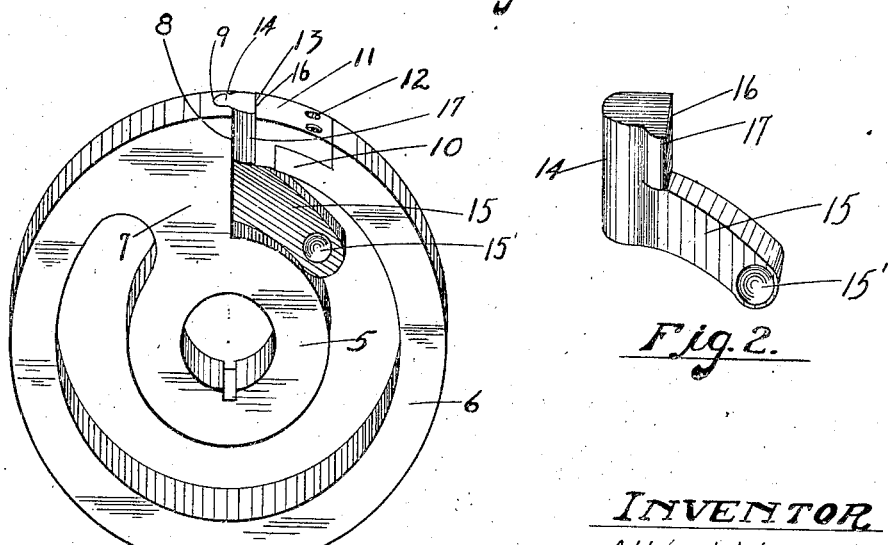
Figure 1 is a perspective of the expansible clutch element.
Figure 2 is a perspective of the clutch expander.

The clutch of my invention is capable of being utilized in various combinations and mechanisms and but one adaptation of the same is here shown in which there is a shaft 2 upon which is loosely mounted a stepped pulley which may be driven by the usual pulley belt, not shown. In the larger end of the pulley 3 there is formed a clutch chamber 4 and within this chamber there is an expansible clutch member which consists of a hub 5 which may be non-rotatively secured on the shaft 2.

Integrally or rigidly secured to the hub is an annulus 6 of suitable dimensions, preferably somewhat less in diameter than the internal face of the flange of the pulley 3 which forms the clutch chamber 4. The annulus is shown as connected to the hub 5 by a radial, connecting portion 7 and this has a radial face 8 which is provided with a radially extending and semi-circular concave seat 9 spaced from which is the contiguous end 10 of the concentric annulus 6 which is thus shown as split.

The clutch member thus described may be made of any suitable material, as, for instance, cast iron or other inexpensive metal, and thus secure economical construction. To secure durability and length of life of the device the yieldable end 10 of the annulus 6 is shown as provided with a removable and renewable wear taking shoe 11; the annulus end being mortised to receive a complementary overhanging portion of the shoe 11 and through which pass fastening means as screws 12. The shoe has a plane face 13 substantially parallel to the radial face 8 of the clutch member and between these faces there is interposed an expanding device or dog. This device is shown as having a rocking body 14 of semi-cylindrical contour to rest and rock in the radial seat 9 of the clutch part 7, and extending from the lower end of the roller body 14 is a curved lever arm 15.

The dog 14 has a plane face at one side of the rocking body 14 and this bears against the plane face 13 of the wearing shoe 11 which may be of high grade or tool steel to obtain durability. A cam-like shoulder or lug 17 extends radially from the center of the rocking body 14 so that when the lever 15 is pressed by suitable means the rocking body 14 rocks in its bearings and the dog shoulder 17 swings against the face of the shoe and thus effects a spreading of the split annulus 6 with the result that the periphery of the same binds upon the encircling surface of the clutch chamber 4 and the driven pulley 3 becomes rotatively secured to the clutch member 6 which in turn, being keyed on the shaft 2, drives the latter.

A simple and practical form of dog actuating device is shown as comprising a pin 20 having a rounded end engaging a socket 15' in the end of the dog lever 15. The pin 20 is shown as extending laterally from a shiftable disc 21 splined on the shaft 2 and operative by any shifting device as a collar 22 engaged by a yoke 23 connected to an actuating lever arm 24. This arm is shown as attached to a link 25 or other means for operating the lever arm 24 and the yoke 23.

From the above it will be seen that I have provided a clutch which is devoid of springs and is made of few and practicable parts radially operative and which clutch consists of an expansible, resilient, split annulus capable of being radially expanded to effect a clutching or connecting of the cooperative parts and which split annulus is inherently contractive so that it will disengage itself from the complementary driving pulley or device when pressure is removed from the dog or clutch setting device 15.

Further embodiments, modifications and variations may be resorted to within the spirit of the invention as here claimed.

What is claimed is:

1. A clutch comprising, in combination, an expansible clutch member having a circular periphery, a device having a clutch chamber and in which said member is expansible to frictionally engage said device, said member including a split annulus with a rigid end, and means for expanding said annulus, said means including a semi-cylindrical rocking element reactive between the rigid and the free end faces of the split annulus, said element having a shoulder engaging the yielding end of the annulus and having a rocking bearing in the rigid end of the annulus.

2. A machine element consisting of a split annulus having a hub member and a fixed end, an expanding dog mounted between the opposed faces in the split portion of the annulus, and means for actuating the said expanding dog, the dog consisting of a semi-cylindrical rocking body portion pivotally supported in the fixed end of the annulus and having an offset shoulder engaging the yielding end of the annulus.

3. A machine element consisting of a split annulus having a hub member, an expanding dog mounted between the opposed faces in the split portion of the annulus, means for actuating the said expanding dog, the dog consisting of a semi-cylindrical rocking body portion countersunk and pivotally supported in one end of the annulus and having an offset shoulder engaging the yielding end of the annulus, and a lever arm extending from the body portion of the dog and engageable by said actuating means.

4. A machine element consisting of a split annulus having a hub member with a radial arm fixing one end of the annulus, said arm and fixed end having a radially grooved face, an expanding dog mounted between the opposed faces in the split portion of the annulus and means for actuating the said expanding dog, the dog consisting of a semi-cylindrical rocking body portion pivotally supported in the groove in the fixed end of the annulus and having an offset shoulder engaging the yielding end of the annulus.

5. A machine element consisting of a split annulus having a hub member with a radial arm, said arm having a radially grooved face, an expanding dog mounted between the opposed faces in the split portion of the annulus, means for actuating the said expanding dog, the dog consisting of a semi-cylindrical rocking body portion countersunk and pivotally supported on one end of the annulus and having an offset shoulder engaging the yielding end of the annulus, and a lever arm extending from the body portion of the dog and engageable by said actuating means.

In testimony whereof I have signed my name to this specification.

ALBERT WORCESTER.